United States Patent [19]

Lomet et al.

[11] Patent Number: 5,276,872
[45] Date of Patent: Jan. 4, 1994

[54] CONCURRENCY AND RECOVERY FOR INDEX TREES WITH NODAL UPDATES USING MULTIPLE ATOMIC ACTIONS BY WHICH THE TREES INTEGRITY IS PRESERVED DURING UNDESIRED SYSTEM INTERRUPTIONS

[75] Inventors: David B. Lomet, Westford; Betty J. Salzberg, Newton, both of Mass.

[73] Assignee: Digital Equipment Corporation, Maynard, Mass.

[21] Appl. No.: 720,405

[22] Filed: Jun. 25, 1991

[51] Int. Cl.$^5$ .............................................. G06F 11/00
[52] U.S. Cl. ................................ 395/600; 364/281.9; 364/285.1; 364/DIG. 1; 364/282.1; 364/282.3; 364/283.1
[58] Field of Search ........................................ 395/600

[56] References Cited

PUBLICATIONS

C. Mohan et al., "Aries/IM: An Efficient and High Concurrency Index Management Method Using Write-Ahead Logging", Aug. 29, 1989.
C. J. Date, *An Introduction to Database Systems*, 1986, pp. 63-67 pp. 413-416.
[BASc] Bayer, R., Schkolnick, M., Concurrency of Operations on B-Trees, Acta Informatica, vol. 9 (1977) pp. 1-21.
[EGLT] Eswaren, K., Gray, J., Lorie R. and Traiger, I., The Notions of Consistency and Predicate Locks in a Database System, Communications of ACM vol. 19, No. 11 (Nov. 1976) pp. 624-633.
[LeYa] Lehman, P., Yao, S. B., Efficient Locking for Concurrent Operations on B-Trees. ACM Trans on Database Systems, vol. 6, No. 4 (Dec. 1981) pp. 650-670.
[Lom1] Lomet, D. B. Process structuring, synchronization, and recovery using atomic actions, Proc. ACM Conf. on Language Design for Reliable Software, SIGPLAN Notices 12, 3 (Mar. 1977) pp. 128-137.
[Lom2] Lomet, D. B. Subsystems of Processes with Deadlock Avoidance, IEEE Trans. on Software Engineering, vol. SE-6, No. 3 (May 1980) pp. 297-304.
[LoSa1] Lomet, D., Salzberg, B., Access Methods for Multiversion Data, Proc. ACM SIGMOD Conf. 1989, Portland, OR., pp. 315-324.
[LoSa2] Lomet, D., Salzberg, B. The hB-Tree: a Multiattribute Indexing Method with Good Guarantee Performance [to appear in] ACM Trans on Database Systems, vol. 15, No. 4 (Dec. 1990).
[MHLPS] Aries: A Transaction Recovery Method Supporting Fine-Granularity Locking and Parial Rollbacks Using Write-Ahead Logging, IBM Research Report RJ 6649, (Jan. 1989) IBM Almaden Research Center, San Jose, Calif.
[Sagi] Sagiv, Y., Concurrent Operations on B* trees with overtaking, Journal of Computer and System Sciences, vol. 33, No. 2 (1986) pp. 275-296.
[Salz] Salzberg., B., Restructuring the Lehman-Yao tree, Northeastern University Technical Report TR BS-85-21 (1985), Boston, Mass.
[ShGo] Shasha, D., Goodman, N. Concurrent Search Structure Algorithms, ACM Trans. on Database Systems, vol. 13, No. 1 (Mar. 1988) pp. 53-90.

*Primary Examiner*—Thomas C. Lee
*Assistant Examiner*—Burch Harper
*Attorney, Agent, or Firm*—Arnold, White & Durkee

[57] ABSTRACT

The present invention includes an approach to index tree structure changes which provides high concurrency while being usable with many recovery schemes and with many varieties of index trees. The present invention permits multiple concurrent structure changes. In addition, all update activity and structure change activity above the data level executes in short independent atomic actions which do not impede normal database activity. Only data node splitting executes in the context of a database transaction. This feature makes the approach usable with diverse recovery mechanisms, while only impacting concurrency in a modest way. Even this impact can be avoided by re-packaging the atomic actions, at the cost of requiring more from the recovery system.

12 Claims, 4 Drawing Sheets

A. SPLIT A CORNER FROM A.

B. USE A K-D TREE AS A SIBLING TERM TO INDICATE THE BORDERS OF B.

C. WHEN USING THE LOCAL TREE FOR A SPLIT, REPLACE EXTERNAL MARKERS WITH ADDRESSES OF NEW SIBLINGS.

CONCURRENCY AND RECOVERY FOR INDEX TREES WITH NODAL UPDATES USING MULTIPLE ATOMIC ACTIONS BY WHICH THE TREES INTEGRITY IS PRESERVED DURING UNDESIRED SYSTEM INTERRUPTIONS

FIELD OF THE INVENTION

The present invention relates generally to linking memory files in software programs and, more particularly, to arrangements and techniques for indexing files in software systems so as to permit multiple (concurrent) access of the indexed files in such a way as to permit the index of such files to be structurally correct despite system failures.

BACKGROUND OF THE INVENTION

The higher a node is in an index tree, the more likely it is to be accessed. This is because data associated with lower nodes are typically accessed through at least one upper node. Thus, the manner in which the nodes, and their associated data, are linked and arranged is critical with respect to the speed and accuracy of the data access.

Figure 1:
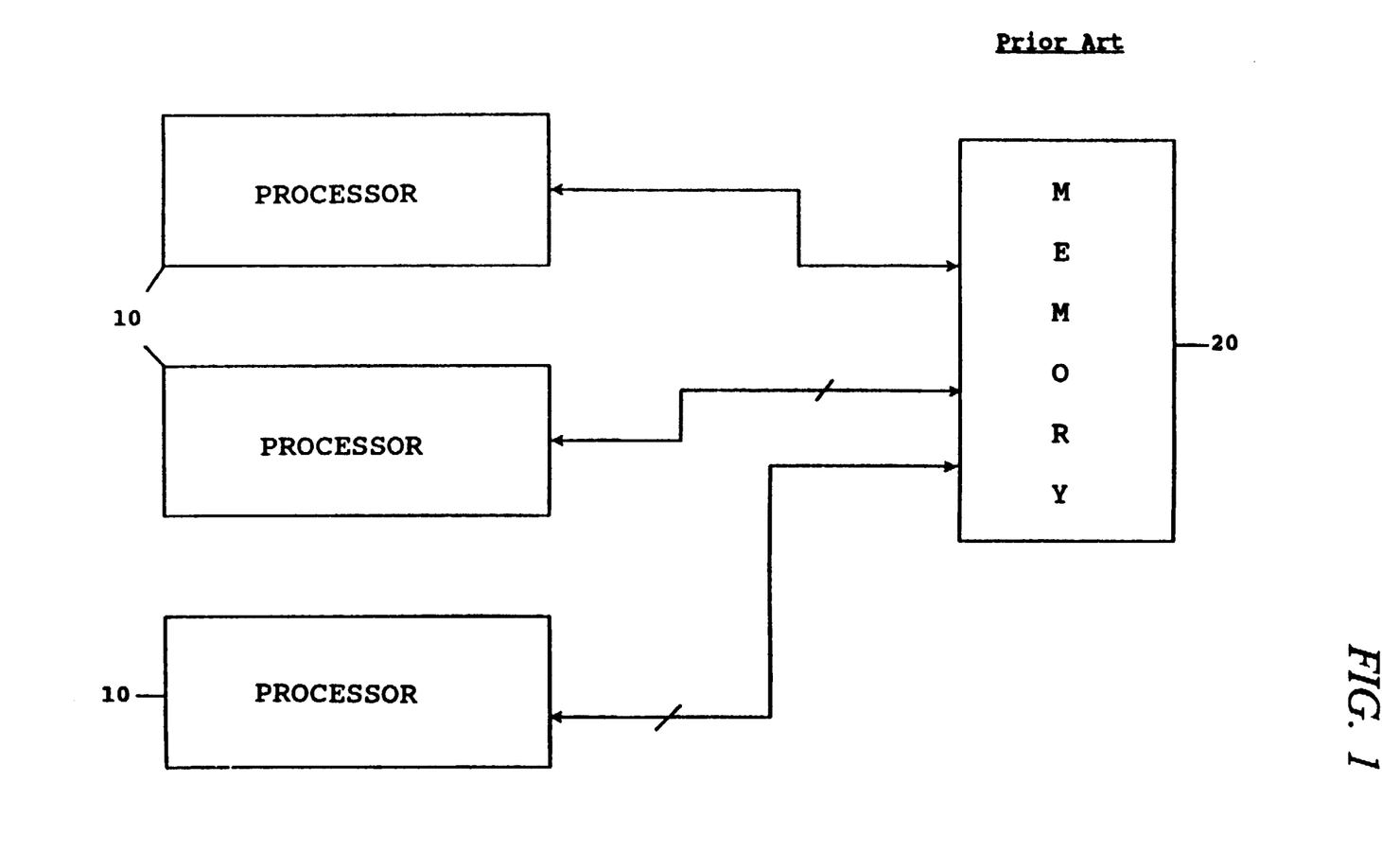
FIG. 1 is a diagram of a conventional processor arrangement typifying an application for the present invention.

As illustrated in FIG. 1, a common type of indexing arrangement permits multiple (virtual) processors 10 concurrent access to an index tree in memory 20. The subject of concurrency in indexing arrangements has a long history, with many aspects of indexing discussed at length. For example, concurrency in $B^+$-trees has been addressed in Bayer, R., Schkolnick, M., Concurrency of operations on B-trees. *Acta Informatica* Vol. 9 (1977) pp 1-21; Lehman, P., Yao, S. B., Efficient Locking For Concurrent Operations On B-Trees, *ACM Trans on Database Systems*, Vol. 6, No. 4 (December 1981) pp. 650-670; Sagiv, Y., Concurrent Operations On B* Trees With Overtaking, *Journal of Computer and System Sciences*, Vol. 33, No. 2, (1986) pp. 275-296; Salzberg., B., Restructuring The Lehman-Yao Tree, *Northeastern University Technical Report* TR BS-85-21 (1985), Boston, Mass.; Shasha, D., Goodman, N., Concurrent Search Structure Algorithms *ACM Trans. on Database Systems*, Vol. 13, No. 1 (March 1988) pp. 53-90. Unfortunately, except for the last listed paper, none of these papers addresses the problem of system crashes during structure changes.

The occurrence of a system crash during a structure change can severely impede the normal use of the system. In a multiple access system, a structure change to a set of nodes in an index tree typically requires an access lock on the data associated with those nodes. This permits the system to rearrange the data and the associated linking information without losing the identity of the data, its node and/or its relation to other nodes in the index. In structures such as the $B^+$-tree, where all data is stored in the leaves, upper level index nodes are only written when the shape of the tree changes. It is important then that these structure changes hold only short-term locks on index nodes, i.e., prohibit reads on data for the associated node(s), to facilitate concurrent access to the leaves via the index.

If a system crash occurs while the tree is being restructured, access to the leaves that are linked to, and/or emanate from, the index nodes may be blocked. While the likelihood of this blockage problem is dependent on the point at which the crash occurred during the restructuring process, because the inaccessibility of the blocked data may be permanent, any possibility of such an occurrence is an unacceptable possibility.

In Mohan, C. and Levine, F., ARIES/IM, An Efficient And High Concurrency Index Management Method Using Write-Ahead Logging, *IBM Research Report* RJ 6846, (August 1989) IBM Almaden Research Center, San Jose, Calif., a solution to this crash problem is suggested. The solution employs a nodal linking technique that anticipates a system crash by logging the next steps that must be executed in the event that a system crash occurs. In this manner, the system has a record of what it is about to do next (after a crash occurs).

This technique, unfortunately, is burdensome in terms of its applicability and flexibility for various types of index trees and recovery methods.

Accordingly, there is a need for method of concurrency in an indexing arrangement that is capable of managing concurrency and recovery for a wide class of index tree structures.

OBJECTS AND SUMMARY OF THE INVENTION

It a general object of the present invention to provide an indexing arrangement that is capable of managing concurrency and recovery for a wide class of index tree structures and which overcomes the deficiencies of the prior art.

It is a more particular object of the present invention to provide an indexing arrangement that is capable of managing concurrency and recovery for single attribute, multiattribute, and versioned index tree structures.

Another object of the present invention includes providing an indexing technique which makes it possible to hold only short-term locks on non-leaf nodes by defining a search structure, called a II-tree, that is a generalization of the $B^{link}$-tree. This generality means that the present invention can be applied to a large number of specific search structures.

Another object of the present invention includes providing a II-tree structure having changes which consist of a sequence of atomic actions. Each action leaves the tree well-formed. Most of these actions are separate from the transaction whose update triggered the structure change.

The present invention also provides an indexing arrangement and technique wherein when a II-tree structure change is interrupted by a system crash, the structure change is completed when the intermediate state is detected during normal subsequent processing after the crash. System crash recovery takes no special measures. Complete structural changes are not serializable. Searchers can see intermediate states of the II-tree. It is the strength of the II-tree that these intermediate states are well-formed. Well-formed intermediate states enable the decomposition of structure changes into a number of atomic actions. A system crash may cause an intermediate state to persist for some time. When such a state is detected during normal database operation, a completing atomic action is scheduled. The state is tested again in the completing atomic action to assure the idempotence of completion.

In a preferred embodiment for use in a computer system which allows a plurality of processing elements to access memory concurrently during a normal operating mode, a method of maintaining a nodal tree arrangement is provided comprising the following steps: Providing a multitude of data records (or segments), each of said data segments having an associated node and said nodes being linked in the nodal tree arrangement to other of the nodes by at least one of the following types of linking relationships: parental, child and sibling; Reconfiguring the nodal tree arrangement using a sequence of atomic actions; Providing indicia means for indicating whether or not each of the atomic actions in the sequence has been performed; In response to an undesired and abnormal system interruption during the step of changing the nodal tree network, resuming the normal operating mode and completing the sequence of atomic actions during the normal operating mode so that the nodal tree arrangement reconfiguration is completed without blocking concurrent access of the memory by the plurality of processing elements. Each structure change is decomposed into a sequence of atomic actions, where each action leaves the index in a well defined state, even when a complete structure changes has not yet been achieved. This is done by making certain intermediate states well-defined. Well-defined means that normal operations can use the index for successful searching even when the index is in these intermediate states.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DESCRIPTION OF THE PREFERRED EMBODIMENT

I. Introduction

An important aspect, and a part, of the present invention concerns an indexing technique which makes it possible to hold only short-term locks on non-leaf nodes. The search structure defined by this index arrangement will be referred to as a II-tree, which is a generalization of the $B^{link}$-tree described by Lehman, supra. This generality means that the present invention can be applied to a large number of specific search structures.

Changes in the structure of the II-tree structure consist of a sequence of "atomic actions." Each atomic action leaves the tree well-formed. Most of these actions are separate from the transaction whose update triggered the structure change.

When a II-tree structure change is interrupted by a system crash, the structure change is completed when the intermediate state is detected during normal subsequent processing after the crash. System crash recovery takes no special measures.

Complete structural changes are not serializable. Searchers can see intermediate states of the II-tree. It is the strength of the II-tree that these intermediate states are well-formed. Well-formed intermediate states enable the decomposition of structure changes into a number of atomic actions.

A system crash may cause an intermediate state to persist for some time. When such a state is detected during normal database operation, a completing atomic action is scheduled. The state is tested again in the completing atomic action to assure the idempotence (i.e., as if the atomic action occurred exactly once) of completion.

The following sections discuss each aspect of the present invention. Section II defines the II-tree. In section III, atomic actions are described in general. Section IV describes how II-tree structure changes are decomposed into atomic actions, and how to cope with such decomposed changes. Section V presents the specific logic of atomic actions. Section VI explains how a wide array of search structures can be adapted so as to be forms of II-trees. In section VII, a short discussion of results is provided.

II. The II-Tree

The II-tree is a rooted DAG (Directed Acyclic Graph). Each node is responsible for a specific part of the key space, and it retains that responsibility for as long as it is allocated. The first node of a II-tree is responsible for the entire key space.

A node can meet its space responsibility in two ways. It can directly contain data or index terms for the space. Alternatively, it can delegate responsibility for part of the space to a sibling node. When a node delegates responsibility to a sibling node, it identifies the subspaces that are delegated. A sibling term describes a key space for which a sibling node is responsible and includes a side pointer to the sibling.

Any node can contain sibling terms. A II-tree node is not constrained to have only a single sibling, but may have several. Entries in the space for which a node is responsible are all reachable from the node, either immediately or via traversing one of the node's side pointers to another node. This is illustrated via the examples in section VI.

The II-tree is split from the bottom, like the B-tree. Each split results in the original node delegating responsibility for a contained subspace to the new contained node which is a sibling. The original node becomes the containing node and its space is called the containing space.

A split is also normally described by index terms in an index node. Each index term includes a child pointer to a child node and a description of a key space for which the child node is responsible. The node containing the index term for a child node is called the parent node. A parent index node indicates the containment ordering of its children so that the ordering can be followed in traversing the child nodes. The union of spaces for which children of an index node are responsible include the space that is directly contained (not delegated) by the index node.

A level of the II-tree is a maximal connected subgraph of nodes and side pointer edges. Data nodes are at level 0. Data nodes contain only data records and/or sibling terms. As the II-tree grows in height via splitting of a root, new levels are formed. These levels consist solely of index nodes. Index nodes contain index terms and/or sibling terms. Parents nodes are at a level one higher than their children.

Each level of the II-tree is responsible for the entire key space. At each level, there is one node responsible for the whole space, i.e. it is the containing node for the whole key space. Going down from the root, each level describes a finer partition of the space into subspaces directly contained by nodes of that level. This gives the II-tree its name.

A II-tree is well-formed if all subspaces at the data level are reachable from the root via either side pointer or child pointer traversals and the subspace decomposition induced by the subspaces directly contained by the nodes at each level partition the key space. All structure changing atomic actions preserve this well-formedness.

Side pointers and child pointers refer to nodes responsible for the indicated subspaces. A structure where, for example, a pointer refers to a de-allocated node is not well-formed. However, each node at a level need not have a parent node at the next higher level. This is an abstraction and generalization of the idea introduced in the $B^{link}$-tree, as described in Lehman, supra. That is, having a new node connected in the $B^{link}$-tree only via a side pointer is a well-formed state.

In this section, the operations are described on II-trees in a very general way. The steps do not describe how to deal with either concurrent operations or with failures. In particular, the decomposition of structure changes into atomic actions is not shown. This is described in section V, after discussion of how to realize atomic actions and the difficulty of dealing with multiple atomic action structure changes in general.

Searches start at the root of the II-tree. If the subspace directly contained in an index node does not include the search point, a side pointer is followed to a sibling index node. Eventually, a sibling is found which directly contains the space which includes the search point. For that node, an index term child pointer is followed to a lower level node that is responsible for the subspace including the point.

Eventually a leaf(level 0) data node is reached. If the subspace directly contained in a data node does not include the search point, a side pointer is followed to a sibling data node. Eventually, a sibling is found which directly contains the space which includes the search point. The record for the search point will be present in that node, if is exists at all.

In principle, the index is not needed at all. The side pointers can be followed from the original (very first) data node, which is responsible for the entire space, to any other data node.

Preferably, in a node split, the following steps are executed:
1. Allocate space for the new node.
2. Partition the subspace directly contained by the original node into two parts. The original node continues to directly contain one part. The other part is delegated to the new node.
3. Remove from the original node the contents that are delegated and put it into the new node. Include any side pointers to space for which the new node is responsible that had previously been delegated from the original node.
4. Put a sibling term in the original node that refers to the new node.
5. Post an index term describing the split to the parent(s) of these nodes. If space in a parent node is insufficient for the index term, split the parent node and re-post the index term after this split.

Example:

Consider the $B^{link}$-tree. To perform a node split, first allocate a new node. Find the key value that evenly divides the records of the node. Copy all records ("records" may be index entries in index nodes or data records in data nodes) from the original node to the new node whose keys are ordered after the middle record's key. The new node has been delegated the high order key subspace. Copy the old link from the old node to the new node. Then remove the copied records from the old node. Replace the old link with the address of the new node and the split key value. This is the sibling term. Finally, post the address of the new node and the split key value to the parent. This is the index term.

Node consolidation is scheduled when a node's storage utilization drops below some threshold. This threshold can be fairly arbitrary. It is desirable, however, to consolidate nodes before their utilization becomes too low. Otherwise, storage utilization may suffer.

When a page becomes underutilized, it can perhaps be consolidated with one of its siblings, either a sibling whose region contains it, or one of the siblings it contains. The data is always moved from contained node to containing node, regardless of which is the underutilized node. Then the index term for the contained node is deleted and the contained node is de-allocated.

Node consolidation is only possible when contained node and containing node can both be reached via child pointers from the same parent. Thus, it is not possible to empty an index node, as there is no node with which its last child can be consolidated. Node consolidation may be impossible even with multiple children in the same parent because none might contain any of the others. Node splitting can be constrained to prevent this by enforcing the following:

Split Constraint: Each index node resulting from a split has a child node that is responsible for the entire space covered by its parent.

III. Atomic Actions For Updating

Atomic actions should be correctly serialized and have the all or nothing property required of them. The only "locks" preferably required for atomic actions that change an index tree at the index levels, i.e., above the leaf level, are latches. Latches are short-term low-cost locks for which the holder's usage pattern guarantees the absence of deadlock. Latches normally come in two modes, "share(S)" mode which permits others with S latches to access the latched data simultaneously, and "exclusive(X)" mode which prevents all other access so that update can be performed.

For additional discussion of "atomic actions," reference may be made to Lomet, D.B. Process Structuring, Synchronization, and Recovery Using Atomic Actions. *Proc. ACM Conf. on Language Design for Reliable Software*, SIGPLAN Notices 12, 3 (March 1977) pp. 128-137.

Normal database locks are handled by a lock manager, which maintains a graph of who delays whom.

The lock manager detects cycles in this delay graph, which indicate that deadlock has occurred, and aborts one of the parties involved. With latches, the user assumes responsibility for ensuring that deadlock is avoided. Thus, latch acquisition does not involve the lock manager.

For deadlock avoidance, each atomic action claims (declares) the set of resources that it will use. Deadlock is avoided by PREVENTING cycles in a "potential delay" graph which includes conflicts between both locks and claims. See Lomet, Subsystems of Processes With Deadlock Avoidance, *IEEE Trans. on Software Engineering*, Vol. SE-6, No. 3 (May 1980) pp. 297-304. If resources are ordered and locked in that order, the potential delay graph can be kept cycle-free without materializing it. The claimed resources consist, implicitly, of those with higher numbers in the ordering than the last (highest) resource that was locked. As new, higher numbered resources are locked, the claim on lower numbered resources is implicitly relinquished, except for those explicitly locked.

Promoting a previously acquired lock violates the ordering of resources and compromises deadlock avoidance. According to Gray, J. and Reuter, A., *Transaction Processing: Techniques and Concepts*, (book in preparation), lock promotion is the most common cause of deadlock. For example, when two transactions set S latches on the same object to be updated, and then subsequently desire to promote their latches to X, a deadlock results.

Update(U) latches support lock promotion by retaining an exclusive claim on a resource that is currently shared. See Gray, J. N., Lorie, R. A., Putzulo, G. R., and Traiger, I. L., Granularity of Locks and Degrees of Consistency in a Shared Data Base, *IFIP Working Conf on Modeling of Data Base Management Systems*, (1976) pp. 1-29; Lomet, D. B. Subsystems of Processes With Deadlock Avoidance, *IEEE Trans. on Software Engineering*, Vol. SE-6, No. 3 (May 1980) pp. 297-304. They allow sharing by readers, but conflict with X or other U latches. An atomic action is not allowed to promote from a S to an X latch, because this increases its claim. But it may promote from a U latch to an X latch. However, a U latch may only be safely promoted to X under restricted circumstances. Another action with an S latch on the resource should be prevented from having to wait for higher numbered resources. A rule that is preferably observed is that the promotion request is not made while the requestor holds latches on higher numbered resources.

Since a II-tree is usually accessed in search order, parent nodes can be ordered prior to their children and containing nodes prior to the contained nodes referenced via their side pointers. Whenever a node might be written, a U latch is used.

Space management information can be ordered last. Node splitting and consolidation access it, but other updates and accesses do not. Changes in space management information follow a prior tree traversal and update attempt. Hence, latching and accessing this information last is convenient and shortens its latch hold time.

When the order above might be violated, as it would in an upward propagation of node splitting, the activity is decomposed into separate atomic actions. The first action is terminated and a second atomic action is initiated to complete the structure change.

In the absence of knowledge about concurrent atomic actions, using two phase locking is not only sufficient, it is also necessary, in order to guarantee serializability via locking. See Eswaren, K., Gray, J., Lorie, R. and Traiger, I, On the Notions of Consistency and Predicate Locks in a Database System, Communications of ACM Vol. 19, No. 11 (November 1976) pp 624-633. However, when dealing with index trees, the types of possible atomic actions are known. Because of this, there are circumstances in which early release of latches does not compromise serializability.

Suppose, for example, an atomic action holds a latch on the node whose subspace contains the entry of interest. The higher level nodes are not revisited in the atomic action. Hence, latches on the higher level nodes can be released. An atomic action commutes with other atomic actions that are accessing or manipulating nodes outside the subtree rooted by the latched node.

Other cases where early release is acceptable include (i) releasing a latch when the resource guarded has not been changed and the state observed will not be relied upon for subsequent execution, and (ii) demoting a latch from X to U mode when a lower level latch is sufficient to provide serializability even when a higher level node has been changed.

Write-ahead logging (the WAL protocol) is preferably used to ensure that actions are atomic, i.e., all or nothing. The WAL protocol assures that actions are logged so as to permit their undo, prior to making changes in the stable database.

The atomic actions of the present invention are not user visible and do not involve user commitment promises. Atomic actions need only be "relatively" durable. That is, they are durable prior to the commitment of transactions that use their results. Thus, it is not necessary to force a "commit" record to the log when an atomic action completes. This "commit" record can be written when the next transaction commits, forcing the log. This transaction is the first one that might depend on the results of the atomic action.

Atomic actions complete or partial executions are be rolled back. Hence, the recovery manager needs to know about atomic actions, as it is the database system component responsible for the atomicity property, i.e. the all or nothing execution of the action.

Three possible ways of identifying an atomic action to the recovery manager are as (i) a separate database transaction, (ii) a special system transaction, or (iii) as a "nested top level action." See ARIES: A transaction Recovery Method Supporting Fine-Granularity Locking and Partial Rollbacks Using Write-Ahead Logging, *IBM Research Report* RJ 6649, (January 1989) IBM Almaden Research Center, San Jose, Calif. The present invention works with any of these techniques, or any other that guarantees atomicity. One strength of the present invention is that it realizes high concurrency while providing independence from the details of the surrounding database system.

IV. Multi-action Structure Changes

The database activity that triggers a structure change is largely isolated from the change itself. It is this separation that enables the high concurrency of the present invention, independent of the particular recovery method that is used by the database. This is in contrast to the ARIES/IM method described in ARIES/IM: An Efficient and High Concurrency Index Management Method Using Write-ahead Logging, by Mohan, C. and Levine, F., *IBM Research Report* RJ 6846, (August 1989) IBM Almaden Research Center, San Jose, Calif., in which the success of the method depends in an essential way on the fact that the ARIES recovery method is used. Independence results from dividing a structure change into a number of atomic actions.

The multiple atomic actions involved in a structure change are truly independent. Only then can they be scheduled independently. Only then can an intervening system crash interrupt the structure change, delaying its completion for a potentially long period. The bad news of independence is that information acquired by early atomic actions of the structure change cannot be trusted by later atomic actions. The II-tree may have been altered in the interim.

Not trusting saved information is not the same as not using it. Exploiting saved information is an important aspect of efficient structural changes for index trees. For example, the disk pages that contain index tree nodes are usually cached, hence avoiding the need to re-fetch them from the disk. More frequently, saved information is verified before it is used, and in general, later atomic actions verify that their execution remains appropriate.

A system crash may interrupt a structure change after some of its atomic actions have been executed, but not all. This leaves the II-tree in an intermediate state. Such states are, of course, well-formed. However, searching a tree in these intermediate states may result in more nodes on a search path or in the existence of underutilized nodes. Hence, all crash-interrupted structure changes are preferably completed.

Database crash recovery does not know about structure changes or whether they have not been completed. Structure changes should be completed in some other way. A key to this is detecting the intermediate states of incomplete structure changes during normal processing, and then scheduling atomic actions that complete them.

The need to post an index term is indicated by a tree traversal that includes following a side pointer. At this time, an atomic action to post the index term is scheduled. Several tree traversals may follow the same side pointer, and hence try to post the index term multiple times. A subsequent node consolidation may have removed the need to post the index term. These are acceptable because the state of the tree is testable. Before posting the index term, a test is performed to determine if the posting has not already been done and still needs to be done.

The need to perform node consolidation is indicated by encountering an underutilized node. At this point, a node consolidation is scheduled. As with node splitting, the index tree state is tested to make sure that the consolidation is only performed once, and only when appropriate.

Whether node consolidation is possible has a major impact on the nature of the atomic actions. More than an additional "node consolidation" operation is involved. The invariants upon which other atomic actions depend are altered.

When consolidation is not permitted, the Consolidation Not Supported ("CNS") Invariant is defined as: A node, once responsible for a key subspace, is always responsible for the subspace. With the CNS invariant, a node may still delegate responsibility for part of its subspace to a sibling. But there is a side pointer from the original node to the sibling. Thus, saving nodes on traversed paths is useful in avoiding re-traversals. Side pointers may need to be followed, however, to find the entry of interest. This has three practical effects:

1. During a tree traversal, an index node is searched for an index or sibling term for the pointer to the next node to be searched. Latches do not have to be held so as to assure the pointer's continued validity. The latch on an index node can be released after a search and prior to latching a child or sibling node. Only one latch at a time is held during traversals.

2. During a node split, the parent index node to be updated is either the one saved during the original traversal (the usual case) or a node that can be reached by following sibling pointers.

3. When posting an index term in a parent node, it is not necessary to verify the existence of the nodes resulting from the split. These nodes are immortal and remain responsible for the key space assigned to them during the split.

When consolidation is permitted, the Consolidation Possible ("CP") Invariant is defined as: A node, once responsible for a key subspace, remains responsible for the subspace only until it is de-allocated. The CP invariant means that de-allocated nodes are not responsible for any key subspace. When re-allocated, they may be used in any way, including being assigned responsibility for different key subspaces, or being used in other indexes. This affects latch retention during searches and the "validity" of remembered state.

When doing a tree traversal, latch coupling can be used to ensure that a node referenced via a pointer is not freed before the pointer de-referencing is completed. The latch on the referenced node is acquired prior to the release of the latch on the referencing node. Thus, two latches need to be held simultaneously during a tree traversal.

While saved path information can make re-traversals of an index tree in later atomic actions very efficient, it needs to be verified before being trusted. Thus, in addition to remembering the nodes themselves, the state identifiers that indicate the states of each node have to be remembered as well to facilitate verification. State identifiers are described in Lomet, D.B. Recovery for Shared Disk Systems Using Multiple Redo Logs, *Digital Equipment Corp. Technical Report* CRL90/4 (October 1990) Cambridge Research Lab, Cambridge, Md.

There are two strategies for handling saved information.

1. De-allocation is not a Node Update: A node's state identifier is unchanged by de-allocation. It is impossible to determine by state identifier examination if a node has been de-allocated. However, any node reachable from the root via a tree traversal is guaranteed to be allocated. Thus, when re-traversing the tree, one starts at the root, which does not move and hence is always valid. A node on the path is accessed and latched using latch coupling, just as in the original traversal. If a node and its state id equal the remembered node and state id, the remembered descendent is used to avoid a second search of the node. Typically, a path re-traversal is limited to re-latching path nodes and comparing new state ids with remembered state ids. If a changed node or state id is encountered, a normal tree traversal, including node searches, completes things.

2. De-allocation is a Node Update: Node de-allocation changes not only space management information, but also the node's state identifier to indicate that de-allocation has taken place. This should require the posting of a log record and possibly an additional disk access. However, the remembered parent node in the path will always be correct if its state identifier has not changed and re-traversals can begin from there. Since node de-allocation is rare, full re-traversals of the tree are usually avoided. If it has changed, however, one goes up the path, setting and releasing latches until a valid node is found. Normal re-traversals begin at the lowest node with unchanged state identifier.

Verifying saved information by comparing state ids is a very general technique. To post an index term, the position in the parent node where the new index term is to be placed may be saved. A comparison of state ids will usually replace the search for this location.

Prior to posting an index term for a node split, a test is made to verify that the nodes produced by the split continue to exist. Thus, in the atomic operation that posts the index term, a test is also made to verify that the nodes that it describes exist by continuing our traversal down to these nodes. Similarly, when deleting an index term, the nodes are consolidated in the same atomic action as the deletion.

In the following three situations, an atomic action may interact with database transactions and require database locks:

1. Normal database record access (fetch, insert, delete, or update of a data record) requires a database lock on the record in question.

2. Data node splitting, which is done as part of the database transaction, may require database locks.

3. Data node consolidation, while not part of a database transaction, may require database locks.

Because the lock manager has no knowledge of latches particular care is taken when atomic actions use both latches and database locks.

Holders of database locks may be required to wait for latches on data nodes. Two transactions updating the same node can deadlock. For example, transaction T1 updates record R1 in node N1. Transaction T2 latches N1 in X or U mode and tries to update R1. It waits. Transaction T1 now tries to update a second record in N1 and is forced to wait for the latch. This wait is not known to the lock manager and results in an undetected deadlock. Thus, the No Wait Rule should be observed, which is: actions do not wait for database locks while holding any node latch that can conflict with a holder of a database lock.

A general strategy for dealing with an action that waits for a database lock is to abort it, releasing all its latches and undoing its effects. Then the requested locks are acquired and the atomic action is re-executed in its entirety, making use of saved information where appropriate. However, for the specific operations of our method, this general strategy is unnecessary. The problem is solvable by releasing only certain latches, waiting for the needed locks to be granted, and then resuming the atomic action.

While holding data node latches while waiting for locks risks undetected deadlock, latches on index nodes may be held while waiting for locks. Except for data node consolidation, no atomic action or database transaction does both of the following: (i) holds database locks; and (ii) uses other than S latches above the data node level. Thus, S latches on index nodes never conflict with database transactions, only with index change atomic actions. Except for consolidate, these actions never hold database locks.

Accordingly, it remains to be demonstrated only that data node consolidations will not cause deadlocks if they hold U latches at parent-of-leaf level at the same time they are waiting for database locks. But data node consolidations with the same parent node are serialized. Each acquires the U latch on the parent node before requesting any database locks. Neither can be waiting for the U latch on the parent while holding database locks.

Data node splitting and consolidation only use database locks for some recovery protocols. For example, if undos of updates of database records take place on the same page (leaf node) as the original update, the records cannot be moved until their transaction commits or aborts. In this case, a move lock is used that conflicts with any such update so as to prevent records from being moved until the updating transactions complete.

A move lock can be realized with a set of individual record locks, a page-level lock, a key-range lock, or even a lock on the whole relation. This depends on the specifics of the lock manager. The minimum requirement is that moved records be locked and that the move lock conflict with updaters. Since reads do not require redo, concurrent reads can be tolerated. Hence, move locks can be share mode locks.

If the move lock is implemented using a lock whose granule is a node size or larger, once granted, no update activity can alter the locking required. This one lock is sufficient. When the move lock is realized as a set of record locks, changes to a node can result in the need for additional records to be locked. This is an instance of the phantom problem. Since the space involved—one node—is limited, the frequency of this problem should be very low.

This "phantom" problem can result in the following outcomes during the re-accessing of data nodes whose latches were released. In each case, the data node to be consolidated or split is re-latched. Then, the node is examined for changes (records inserted or deleted).

1. No change is required to the locks needed to implement the move lock. Proceed with the structure change.

2. The structure change becomes unnecessary. Abort the structure change action.

3. The structure change remains necessary, but different locks are needed to implement the move lock. Where previously acquired locks that were thought to be needed to implement the move lock are now inappropriate, release the locks. Try to get any needed locks on the new record(s). If a wait is required, release data node latches again and repeat this sequence.

Atomic actions that are spawned as a result of a database transaction need to be scheduled to run. Their performance is improved if they can exploit saved state. Thus, in the scheduling of atomic actions, provision is made to associate saved state with these actions.

1. required database locks: Locks that were identified as needed ahead of time are indicated. When the action is executed, it will request these locks prior to requesting any latches. This will frequently avoid the need to release and then re-acquire data node latches.

2. saved path: It is always potentially useful to save the path traversed by earlier atomic actions. Usually, this path information will remain valid, and hence traversals during subsequent actions will usually be dramatically faster. This is a performance optimization that is important to the practicality of the approach. The information consists of <node, state id, record location> for each node of the path.

V. Structure Changes

Tree updates are decomposed into a sequence of atomic actions, one for each level of the II-tree that is changed. Node consolidation, which makes changes at two levels of the II-tree is considered to be an update at the level of the parent of the consolidated nodes (where an index term is deleted). Each atomic action is an instance of a single universal action, regardless of the specifics of the update.

The program that is outlined considers the situation when node consolidation is possible, (CP), as well as the case where node consolidation is not supported (CNS).

A number of subroutines are identified that will be involved as part of the universal action at appropriate places. For example, given a KEY and a LEVEL "Find Node" returns the address of a node at LEVEL that is responsible for the key space that contains the KEY. The parent node to this node is left S latched. With CP, Find Node uses latch coupling. With CNS, a parent (resp. containing) node latch can be released before a latch on its child (resp. contained sibling) is acquired.

This routine handles both new traversals and re-traversals. To do this, each traversal updates the saved path associated with the structure change. With CP, re-traversals start either at the root (when de-allocation is not an update) or else at the lowest unchanged node of the path (when de-allocation is an update). With CNS, the saved parent of a node can be simply latched and used.

When a side pointer is traversed during Find Node, an index posting action is scheduled for the parent level of the tree. (The root is not allowed to have side pointers.) Similarly (with CP), when an under utilized node is encountered, except at the root level, an index delete action, which also consolidates nodes, is scheduled for the parent level of the node.

"Verify Split" is the name of another operation. "Verify Split" is needed only with CP. It confirms that the node referenced by a new index term still exists. The index node to which the term is to be posted has been found and update latched beforehand. If the index term has already been posted, Verify Split returns indicating that the posting is inappropriate.

Otherwise, the child node which is the original splitting node is S latched. It is accessed to determine whether a side pointer refers to a sibling node that is responsible for the space that contains the space denoted in the new index term. If not, then the node whose index term is being posted has already been deleted. Again, Verify Split returns indicating that posting is inappropriate.

If a sibling exists that is responsible for space containing, but not equal to the space denoted in the index term being posted, latch coupled searching of siblings continues until either it is determined that the node denoted by the new index term has been deleted (the prior case) or else that the node is found. In this later case, Verify Split returns a code indicating that the index posting remains appropriate. The S latches are dropped here so that the U latch on the parent node can be safely promoted to an X latch.

"Split Node" is yet another operation. "Split Node" divides the contents of a current node between the current node and a new node that it allocates. It is invoked whenever the current node has insufficient space to absorb an update. The current node has been U latched beforehand. If the current node is a data node, then a move lock is requested. If a wait is required, the U latch on the current node is released. It is re-acquired after the move lock has been granted. Where the move lock is realized by means of record locks, the record locks will ordinarily involve the moved half of the records of the node. However, when the root is split, all records will move and hence all are locked.

The U latch on the current node is promoted to X. The space management information is X latched and a new node is allocated. The key space and contents directly contained by the current node are divided, such that the new node becomes responsible for a subspace of the key space. A sibling term is placed in the current node that references the new node and its key subspace. The change to the current node and the creation of the new node are logged. These changes are ascribed to the surrounding atomic action or database transaction.

If the split node is not the root of the II-tree, then an index term is generated containing the new node's address as a child pointer, and an index posting operation is scheduled for the parent of the current node.

If the node being split is the root, then Split Node allocates a second node. The current node's contents are removed from the root and put into this new node. A pair of index terms is generated that describe the two new nodes and they are posted to the root. These changes are logged.

Another operation is referred to as "Verify Consolidate". "Verify Consolidate" checks whether a sparse node can be consolidated with another node. The parent of the sparse node has been U latched beforehand. If the consolidation has already taken place, Verify Consolidate returns indicating that the consolidation is inappropriate. If the sparse node is the last child of its parent, consolidation is also inappropriate. Instead, consolidation of the parent is scheduled.

It is preferred that the sparse node is treated as the contained node and move its contents to its containing node as there is less data to move. This is possible, space permitting, when the sparse node is not the containing node for all other child nodes of its parent. In this case, containing and contained nodes are uniquely identified and Verify Consolidate returns indicating that consolidation is appropriate.

When the sparse node is the containing node for all child nodes of an index node, it plays the role of containing node in the consolidation. However, the selection of contained node may not be unique. There are several ways of dealing with this: (i) refuse to consolidate nodes; (ii) arbitrarily choose one contained node, and attempt consolidation with it; (iii) search for a contained node that permits consolidation to proceed. It is assumed that Verify Consolidate indicates whether or not consolidation is appropriate, and if so, identifies a containing node and a contained node, and leaves no latches on any nodes that it may have checked.

"Consolidate Nodes", another operation of the preferred method, absorbs a contained node into its containing node. It is invoked as part of the atomic action that deletes the contained node index term. The parent index node has been U latched previously. The containing node is X latched, followed by X latching of the contained node. These nodes are tested to determine if the containing node has a side pointer to the contained node and there is sufficient space in the containing node to absorb the contained node contents. If not, the X latches are dropped and consolidation is canceled. Canceling the consolidation leads to the need to re-promote the parent U latch to X so as to re-insert the previously deleted index term.

If the nodes to be consolidated are data nodes, a move lock is requested. If a wait is required for the move lock, the X latches on the data nodes are released, but the U latch on the parent is retained. When the move lock is obtained, Consolidate Nodes is re-executed from the start.

The contents of the contained node are then moved to the containing node. The appropriate space management information is X latched and the contained node is de-allocated. Then all X latches are dropped. The changes to containing and contained nodes are logged and ascribed to the node consolidate atomic action.

One should regard our "Universal Action" (called Universal) as encompassing the operations necessary to perform an update at exactly one level of the II-tree. The form of the update will vary. During its execution, however, it may be necessary to make a structure change to the II-tree.

Universal takes the following arguments.

LEVEL of the tree to be updated;

KEY value for the search;

LOCKS that need to be acquired in order for the operation to complete;

OPERATION which is one of (i) posting an index term, (ii) dropping an index term and consolidating two nodes, or (iii) accessing or updating a data node. (The description below is written in terms of updates to simplify the discussion. The access case is simpler and uses S latches instead of U latches).

When accessing or updating a data node, Universal executes as part of a database transaction. However, updates to index nodes are all short duration independent atomic actions. This includes all node consolidations.

Universal performs the following steps:

1. Request Initial Locks: If database locks are known to be needed, this step gets them now, prior to holding any latches. This avoids having to release latches subsequently in order to get them.

2. Search: Execute Find Node to find the node (NODE) at LEVEL that is responsible for the key subspace that contains the entry to be updated. The parent of NODE (P(NODE)) is left S latched. Note that this ensures that researching the tree is avoided and that node consolidations involving children of this node will not occur during this action. When the update is to the root, do not invoke Find Node and do not latch any nodes.

3. Get Target Node: U latch NODE. Traverse sibling pointers, U latch coupling, until the node is found that directly contains the subspace which will be updated. Set NODE to be this node. After this step, NODE is U latched. Update latches are used because it is unknown which node on this level will contain the entry to be updated.

4. Verify Operation Need: Verify that the operation intended is still appropriate.

Data node UPDATE: Regardless of whether this is an insert, delete, or modification of a contained record, no verification is needed.

Index POSTING: Invoke Verify Split to verify that posting the index term remains appropriate. If not, terminate the atomic action.

Index DROPPING: Invoke Verify Consolidation to verify that deleting an index term and consolidating nodes remains appropriate. If not, terminate the atomic action.

5. Space Test: Test NODE for sufficient space to accommodate the update. If sufficient, then X latch NODE and proceed to Request Remaining Locks. Otherwise, NODE is split by invoking "Split Node". (This will not occur for index dropping.) Upon return, check which of the nodes resulting from the split directly contains the entry being updated, and make that NODE. This can require descending one more level in the II-tree should NODE have been the root where the split causes the tree to increase in height. Release the X latch on the other node, but retain the X latch on NODE. Repeat this Space Test step.

6. Request Remaining Locks: If NODE is a data node and database locks have not been acquired because it was not known which were needed a priori, they are requested here. If a wait is necessary, the X latch on NODE is released. After the database locks are acquired, return to Get Target Node.

7. Update Node: Update NODE. Post a log record describing the update to the log. If NODE is a data node, this log record is associated with the database transaction. Otherwise, it is associated with an independent index update atomic action. If the update is not an index dropping, proceed to Sparse Node Check. Otherwise, demote the X latch on NODE to U and proceed to Consolidate.

8. Consolidate: Invoke Consolidate Nodes to consolidate the lower level nodes. If Consolidate Nodes fails, cancel the index dropping atomic action, which undoes the prior NODE update. Note that the U latch retained on the index node permits us to perform the undo by promoting the U latch to X and re-inserting the dropped index term.

9. Sparse Node Check: If NODE is now under-utilized and NODE is not the root, schedule an index dropping atomic action to delete an index term in P(NODE) by consolidating NODE with a sibling. If NODE is the root and it is under-utilized, but has more than one child, this condition is allowed to persist.

If NODE is the root, and it has only a single child, a special atomic action is scheduled that consolidates this child with the root, thus reducing the height of the tree by one. This action is similar to other node consolidates in that it: (i) tests that it is still appropriate, (ii) acquires appropriate latches and the necessary move lock, and (iii) moves the contents of the child node into the root, (iv) de-allocate the child node, and (v) log the effects of the action. It differs from ordinary consolidations only in that the parent serves as the containing node, and that no index term dropping is involved.

10. Complete: Release all latches still held by Universal. If Universal was an independent atomic action, release its database locks and commit the action by writing an appropriate commit record. If this is a data node update, however, the database locks are held by the surrounding database transaction.

Note that the description above causes data node splits to be part of database transactions, such that the split is not committed until the transaction commits. This restricts concurrency somewhat at the data node level. However, it is this feature that permits the method to be used with many recovery schemes. It is possible to decompose the atomic actions so that data node splits can commit independently of the surrounding database transaction. However, it then becomes essential that the recovery scheme used by able to cope, as ARIES does, with records that have moved.

All index updating and all other structure changes take place within independent atomic actions. These actions only execute for a short duration, and while occasionally having to wait, even for a database lock, they never hold latches that prevent normal database activity. The latches act to serialize other such independent atomic actions. Normal database activity commutes (is compatible) with these latches.

VI. Applicability to Various Search Structures

A multiattribute structure where all splits (both at the index and data nodes) are made along hyperplanes, can be regarded as a II-tree. One direction is considered to be the "contained" region and the other to be the containing. For example, it is assumed that the region with the higher values of the split attribute is the contained region. The coordinates of the corners can be used to indicate the boundaries of split-off regions in an arbitrary k-dimensional hyperplane-splitting structure as illustrated in FIGS. 2a–2d.

Figure 2A:
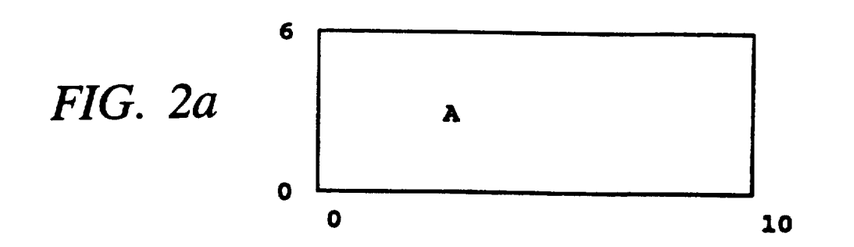
FIGS. 2a-2d comprise a series of diagrams, in accordance with the present invention, showing a multiattribute index and a preferred use of side pointers.
Figure 2B:
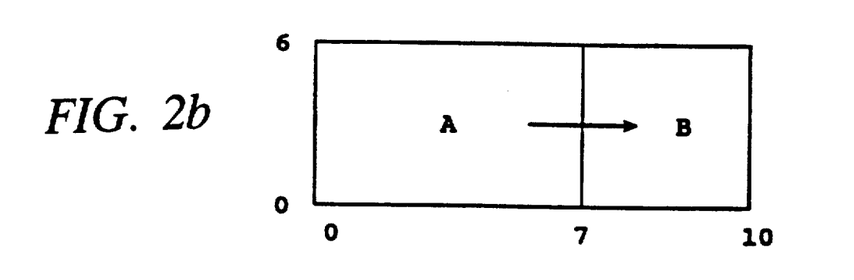

FIGS. 2a and 2b illustrate a first split along the hyperplane depicted as X=7, thereby leaving region A as the containing region and region B as the contained region. In region A, an indication of region B is recorded as X>7. In region B, the low and high X and Y coordinates are B: (7, 10, 0, 6), respectively.

Figure 2C:
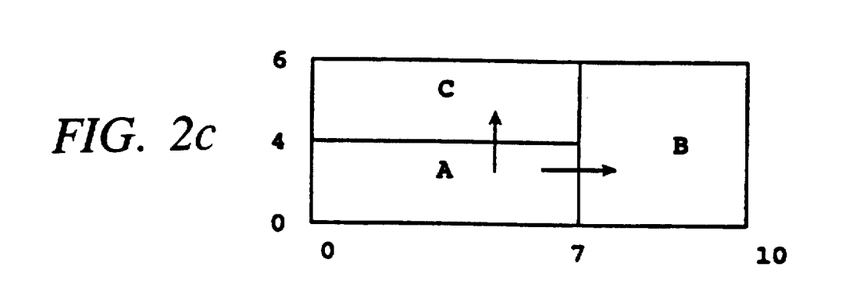

FIG. 2c illustrates a split of region A in a similar manner. The resultant pointers include an indication of the borders of C for region A, and the following low and high X and Y coordinates for regions B and C:

B:(7, 10, 0, 6), and

C:(0, 7, 4, 6).

Figure 2D:
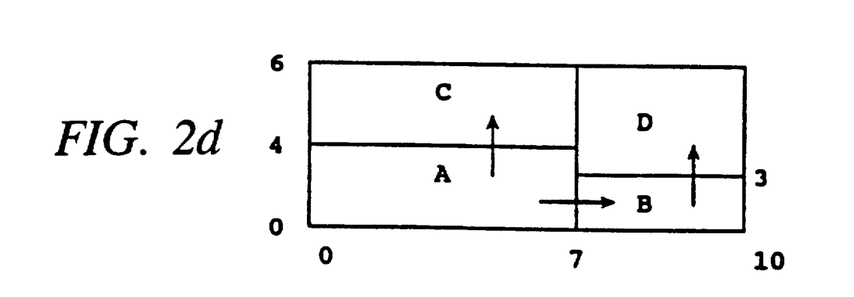

FIG. 2d similarly illustrates a split of region B, with the borders of region D recorded in B as D: (7, 10, 36).

An important special case of such a structure is the one-dimensional $B^{link}$-tree (see Leman, supra; Sagiv, Y., Concurrent operations on B* trees with overtaking, *Journal of Computer and System Science*, Vol. 33, No. 2, (1986) pp. 275-296; and Salzberg., B., Restructuring the Lehman-Yao tree, *Northeastern University Technical Report* TR BS-85-21 (1985). Boston, Mass. Much of the concurrent structure change work for index trees have been done in the context of $B^{link}$-trees. As above, the contained node becomes responsible for the higher key subspace. This work exploits the increased flexibility given by the sibling pointers to improve concurrency in the non-failure cases.

A TSB-tree, which is fully described by Lomet, D., Salzbert, B., in Access Methods For Multiversion Data, *Proc. ACM SIGMOD Conf.* 1989, Portland, Oreg., pp. 315-324, provides indexed access to multiple versions of key sequenced records. As a result, it indexes these records both by key and by time. The present invention used the property that historical nodes (nodes created by a split in the time dimension) never split again. This implies that the historical nodes have constant boundaries and that key space is refined over time.

The index nodes have exact boundaries for historical nodes and possibly outdated boundaries for current nodes. At any level of the tree, some of the index entries for splits which have already occurred may be missing.

Figure 3A:
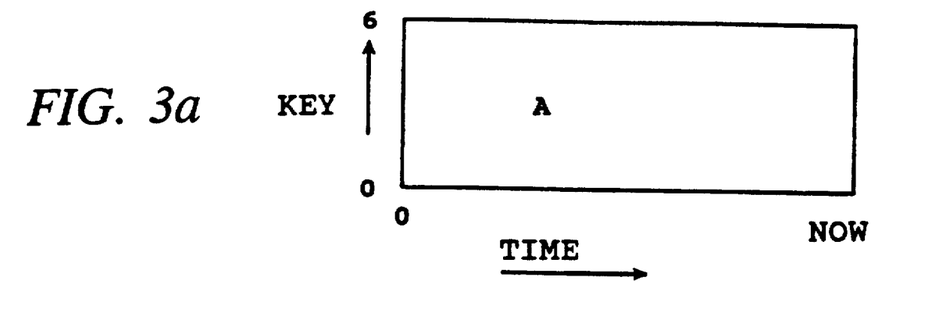
FIGS. 3a-3c comprise another series of diagrams, also in accordance with the present invention, showing application of the present invention for time-split B-trees.
Figure 3B:
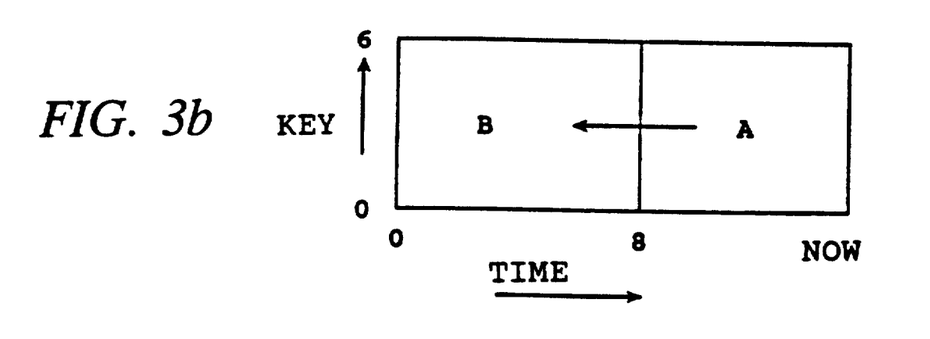
Figure 3C:
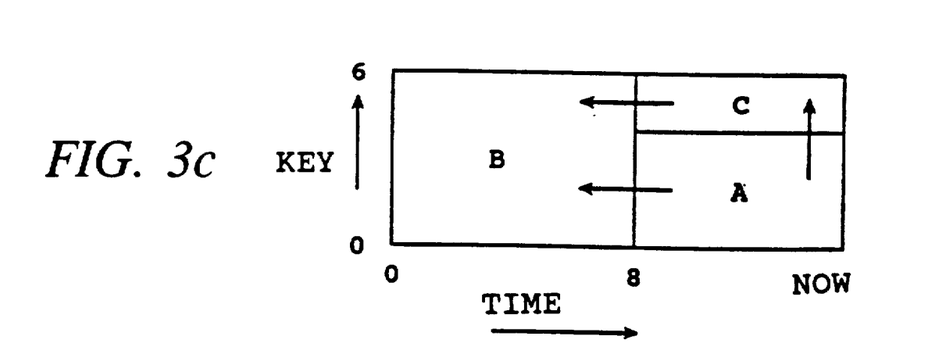

Splits in the TSB-tree can be made in two dimensions, either by time or by key. In FIGS. 3a–3c, the region covered by a current node after a number of splits is in the lower right hand corner of the key space it started with. A time split produces a new (historical) node with the original node directly containing the more recent time. A key split produces a new (current) node with the original node directly containing the lower part of the key space.

With time splits, a history sibling pointer in the current node refers to the history node. The new history node contains a copy of prior history sibling pointers. These pointers can be used to find all versions of a given record.

With key splits, a key sibling pointer in the current node refers to the new current node containing the higher part of the key space. The new node will contain not only records with the appropriate keys, but also a copy of the history sibling pointer. This pointer preserves the ability of the current node directly containing a key space to access history nodes that contain the previous versions of records in that space. This split duplicates the history sibling pointer. It makes the new current node responsible for not merely its current key space, but for the entire history of this key space.

Figure 4A:
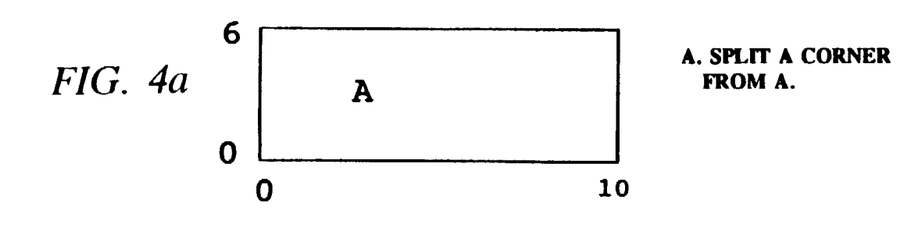
FIGS. 4a-4c comprise a third series of diagrams, also in accordance with the present invention, showing application of the present invention for hB-trees.
Figure 4B:
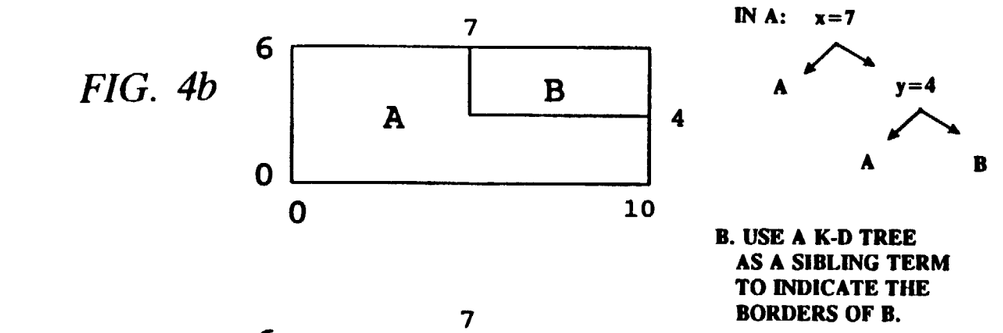
Figure 4C:
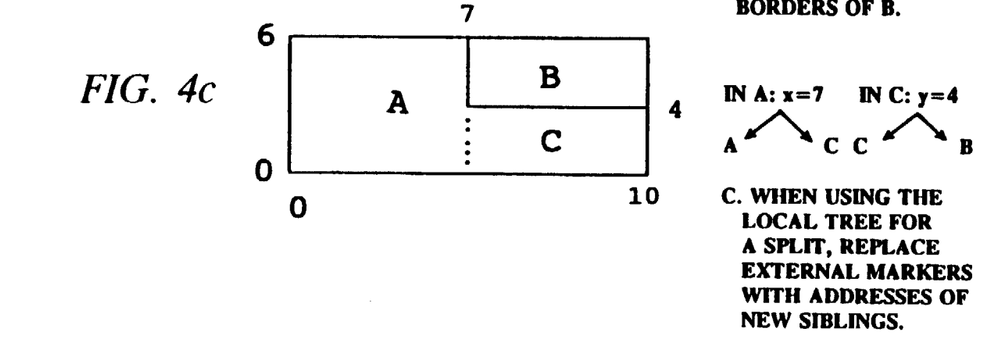

In Lomet, D., Salzberg, B., The hB-tree: A Multiattribute Indexing Method With Good Guaranteed Performance, *ACM Trans on Database Systems*, Vol. 15, No. 4 (December 1990), with respect to the hB-tree the idea of containing and contained pages is explicit and is described with kd-tree fragments. The "External" markers can be replaced with the addresses of the pages which were extracted, and a linking network established with the desired properties. In addition, when the split is by a hyperplane, instead of eliminating the root of the local tree in the splitting node, one child of the root (e.g., the left child) points to the new sibling containing the contents of the right subtree. See The hB-tree:, supra. This makes the treatment of hyperplane splits consistent with that of other splits. This is illustrated in FIGS. 4a–4c. Additional changes are required in order to index nodes to reflect the containment structure of their children.

The foregoing description to index tree structure changes provides high concurrency while being usable with many recovery schemes and with many varieties of index trees. More specifically, the present invention permits multiple concurrent structure changes. In addition, all update activity and structure change activity above the data level executes in short independent atomic actions which do not impede normal database activity. Only data node splitting executes in the context of a database transaction. This feature makes the approach usable with the diverse recovery mechanisms, while only impacting concurrency in a modest way. Even this impact can be avoided by re-packaging the atomic actions, at the cost of requiring more from the recovery system.

While the invention has been particularly shown and described with reference to various embodiments, it will be recognized by those skilled in the art that modifications and changes may be made to the present invention described above without departing from the spirit and scope thereof., as set forth in the following claims.

We claim:

1. For use in a computer system which allows a plurality of processing elements to access a memory concurrently during a normal operating mode, a method of maintaining a nodal tree arrangement which is a data structure for finding data records based on key values stored with the records, comprising the steps of:
- establishing a multitude of data records, each of said data records having an associated node and said nodes being linked in the nodal tree arrangement to other of the nodes by at least one of the following types of linking relationships: parental, child and sibling;
- during the normal operating mode, using a plurality of atomic actions to reconfigure the nodal tree arrangement so as to replace, delete or add a data record;
- each atomic action including executing a set of steps having an end marker indicating that the set of steps has been completed, said set of steps executed without apparent interruption, such that before and after executing said set of steps the nodal tree arrangement is configured for finding any data record stored therein;
- providing a signal to indicate whether or not each of the atomic actions in the plurality has been performed; and
- in response to an undesired and abnormal system interruption during the step of using the plurality of atomic actions to reconfigure the nodal tree network, resuming the normal operating mode and completing the plurality of atomic actions during the normal operating mode so that the nodal tree arrangement reconfiguration permits concurrent access of the memory by the plurality of processing elements.

2. A method of maintaining the nodal tree arrangement, according to claim 1, wherein the step of reconfiguring the nodal tree arrangement using the plurality of atomic actions includes performing each atomic action in a manner that leaves the tree in a connected state.

3. A method of maintaining the nodal tree arrangement, according to claim 1, wherein after completing any of the atomic actions the tree arrangement is retained in an uncompleted reconfiguration state and the nodal tree arrangement is maintained via crash recovery without additional special recovery nodal-tree reformation steps required as a result of the undesired and abnormal system interruption.

4. A method of maintaining the nodal tree arrangement, according to claim 1, wherein after completion of each of the atomic actions the computer system enters an intermediate state from which another atomic action begins.

5. A method of maintaining the nodal tree arrangement, according to claim 1, wherein the step of providing the signal includes the step of indicating that the tree arrangement is being reconfigured.

6. A method of maintaining the nodal tree arrangement, according to claim 5, further comprising a scheduling of a completing atomic action in response to detecting during the normal operating mode that the tree arrangement is in an intermediate state.

7. A method of maintaining the nodal tree arrangement, according to claim 6, further comprising performing the step of completing the scheduled atomic action and, in response thereto, verifying that the tree arrangement is correctly configured.

8. A method of maintaining the nodal tree arrangement, according to claim 1, wherein each node maintains, and has allocated thereto, an entire key space until said node is de-allocated.

9. For use in a computer system which allows a plurality of processing elements to access a memory concurrently during a normal operating mode, a method of maintaining a nodal tree arrangement which is a data structure, comprising the steps of:
- establishing a multitude of data records, each of said data records having an associated node and said nodes being linked in the nodal tree arrangement to other of the nodes by a set of predetermined relationships, and wherein each node maintains a key space by performing at least one of the following steps: containing data records containing index terms for the data records, or delegating responsibility for at least a part of the key space to a sibling node;
- during the normal operating mode, using a sequence of atomic actions to reconfigure the nodal tree arrangement so as to replace, delete or add a data record;
- each atomic action including executing a set of steps having an end marker indicating that the set of steps has been completed, said set of steps executed without apparent interruption, such that before and after executing said set of steps the nodal tree arrangement is configured for finding any data record stored therein;
- providing a signal to indicate whether or not each of the atomic actions in the sequence has been performed; and
- in response to an undesired and abnormal system interruption during the step of using the sequence of atomic actions to reconfigure the nodal tree network, resuming the normal operating mode and completing the sequence of atomic actions during the normal operating mode so that the nodal tree arrangement permits concurrent access of the memory by the plurality of processing elements.

10. A method of maintaining the nodal tree arrangement, according to claim 9, wherein at least one of the predetermined relationships includes at least one of a plurality of sibling nodes.

11. A method of maintaining nodal the tree arrangement, according to claim 9, wherein at least one of the predetermined relationships includes a parent node.

12. A method of maintaining the nodal tree arrangement, according to claim 9, wherein at least two of the predetermined relationships together include a parent node, a child node and a sibling node.

* * * * *